(12) United States Patent
Krebs et al.

(10) Patent No.: US 7,389,967 B2
(45) Date of Patent: Jun. 24, 2008

(54) LONGITUDINAL ADJUSTER FOR A VEHICLE SEAT

(75) Inventors: Jürgen Krebs, Rockenhausen (DE); Peter Strubel, Flonheim (DE); Boris Willems, Schmelz (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 422 days.

(21) Appl. No.: 11/069,871

(22) Filed: Mar. 1, 2005

(65) Prior Publication Data

US 2005/0194510 A1 Sep. 8, 2005

(30) Foreign Application Priority Data

Mar. 4, 2004 (DE) .................... 10 2004 010 489

(51) Int. Cl.
*F16M 13/00* (2006.01)

(52) U.S. Cl. .................................... 248/429; 296/65.13

(58) Field of Classification Search ................ 248/424, 248/429, 430, 503.1; 296/65.01, 65.13, 65.14, 296/65.15; 297/344.11
See application file for complete search history.

(56) References Cited

U.S. PATENT DOCUMENTS

| 1,714,462 | A | 5/1929 | Veau |
| 5,454,541 | A | 10/1995 | Ito |
| 5,570,508 | A | 11/1996 | Ress |
| 6,220,642 | B1 * | 4/2001 | Ito et al. ................... 296/65.14 |
| 6,488,333 | B2 * | 12/2002 | Kim ............................ 297/94 |
| 6,971,620 | B2 * | 12/2005 | Moradell et al. ............ 248/422 |
| 7,048,244 | B2 * | 5/2006 | Hauck ......................... 248/430 |
| 2004/0108436 | A1 * | 6/2004 | Hofschulte et al. .......... 248/424 |
| 2004/0200945 | A1 * | 10/2004 | Hauck ........................ 248/430 |

FOREIGN PATENT DOCUMENTS

| DE | 43 04 107 A1 | 9/1993 |
| DE | 103 15 579 A1 | 1/2004 |
| GB | 2 376 411 | 12/2002 |

* cited by examiner

*Primary Examiner*—Brian Glessner
*Assistant Examiner*—Bradley H Duckworth
(74) *Attorney, Agent, or Firm*—Womble Carlyle Sandridge & Rice, PLLC

(57) ABSTRACT

In a longitudinal seat adjuster (3) for a vehicle seat, in particular a motor vehicle seat, with at least one seat rail assembly (5) including at least two seat rails (11a, 12, 13b) that define an installation space (15) and are powered by a motor to be relocatable in relative position to one another, at least a first spindle (20) and a first spindle nut (21) are located within the installation space (15) and interact with one another, and the installation space (15) allows room for a second spindle (30) and a second spindle nut (31).

18 Claims, 2 Drawing Sheets

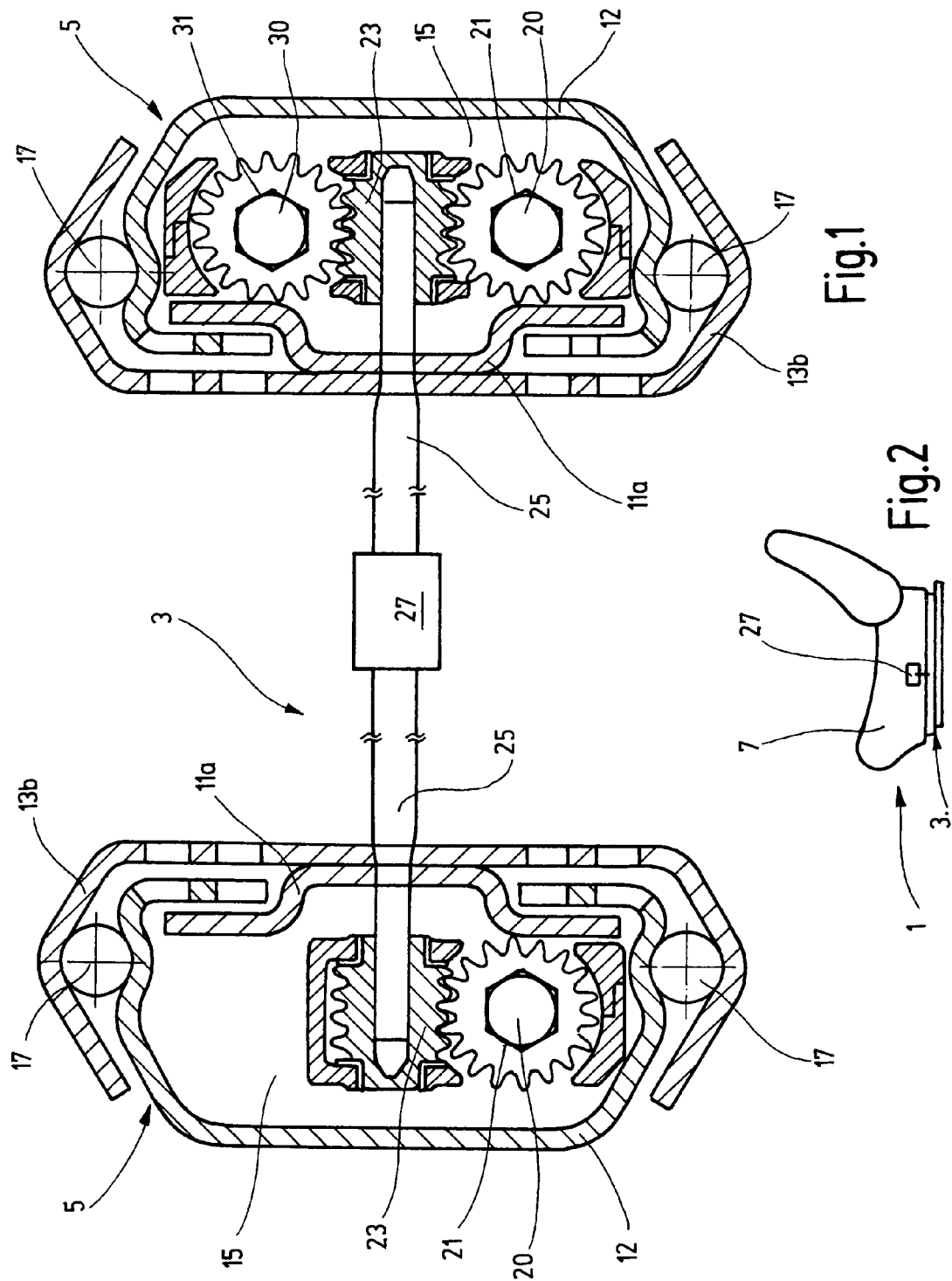

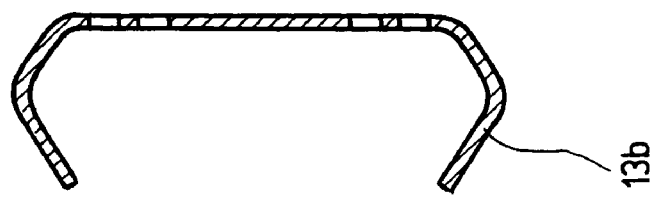
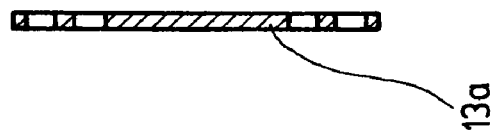
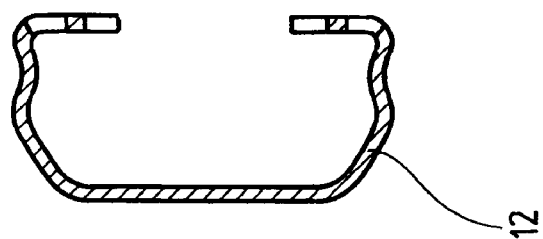
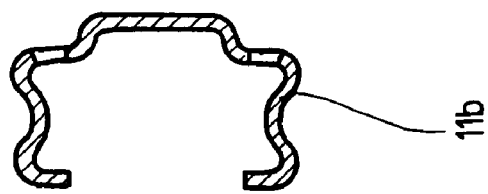
Fig.3

LONGITUDINAL ADJUSTER FOR A VEHICLE SEAT

CROSS-REFERENCE TO RELATED APPLICATION

The present application claims priority to DE 10 2004 010 489.1, which was filed on Mar. 4, 2004, and is incorporated herein by reference.

TECHNICAL FIELD

The present invention relates to a longitudinal adjuster for a vehicle seat and, more specifically, to a longitudinal adjuster including a seat rail assembly with elongate seat rails mounted for allowing relative longitudinal movement therebetween, with the seat rails cooperating with one another to define an installation space tat contains a spindle which interacts with a spindle nut for causing the relative movement between the seat rails.

BACKGROUND OF THE INVENTION

In a longitudinal seat adjuster of the kind mentioned in the above Technical Field section, the installation space in the seat rail assembly substantially solely contains the single spindle, the single spindle nut, and other gearbox parts. In view of avoiding structural damage, and the needed longitudinal locking force, the structural components are appropriately dimensioned in order to meet the various load requirements.

BRIEF SUMMARY OF SOME ASPECTS OF THE INVENTION

In accordance with h one aspect of the present invention, a longitudinal adjuster for a vehicle seat, in particular a motor vehicle seat, has at least one seat rail assembly with h elongate seat rails mounted for allowing relative longitudinal movement therebetween, and the seat rails cooperate with one another to define an installation space. In accordance with this aspect, the adjuster further includes at least a first spindle and at least a first spindle nut that are within the installation space. The first spindle and the first spindle nut are mounted so that they are meshed with one another for allowing relative rotation therebetween, and so that the relative rotation between them at least partially causes the relative longitudinal movement between the seat rails. Further in accordance with this aspect, the installation space is configured in a predetermined manner to be capable of having a second spindle and a second spindle nut within the installation space and meshed together.

Due to the fact that the installation space provides space for a second spindle and a second spindle nut, a modular seat rail assembly is provided which can be adjusted to the required longitudinal locking force via selecting the number of spindles. In case of low load requirements, only one spindle is used. In case of higher load requirements, two spindles are used. The first spindle has the function of longitudinal adjustment. The second spindle increases the longitudinal locking force. That is, in accordance with one aspect of the present invention, the seat rails are designed for the use of one spindle as well as two spindles. In accordance with one aspect of the present invention, the use of one or two spindles does not have any effect on the interface/mounting points between the seat rail assembly and the vehicle structure, and likewise it does not have any effect on the interface/mounting points between the seat rail assembly and the vehicle seat structure. That is, in one example, the use of one or two spindles does not have any effect on the outside geometry and outside dimensions of the seat rail assembly. Each vehicle seat can have two of the modular seat rail assemblies mounted thereto, with the modular seat rail assemblies respectively relegated to being proximate the opposite sides of the vehicle seat and being respectively adapted for the anticipated seat belt force. That is, and for example, the seat rail assembly that is mounted to the same side of the seat as the seat belt buckle can have two spindles and respectively associated spindle nuts, whereas the other seat rail assembly can have only one spindle and associated spindle nut.

For a seat rail assembly with two spindles and spindle nuts, a single drive (e.g., drive motor) can drive both of the spindles or spindle nuts. In view of such a common, at least approximately synchronous drive, the second spindle can be placed parallel to the first spindle and is threaded in the opposite direction as compared to the first spindle (i.e., the substantially simultaneous rotation of the first and second spindle nuts of the same seat rail assembly is in opposite rotational directions). In order for the spindle nuts of the same seat rail assembly to be driven, the seat rail assembly can be provided with a common drive consisting essentially of one worm. The worm engages in the two associated spindle nuts (which can also be referred to as worm gears due to their outer teeth) when two spindle nuts are present. The worm can be powered by a single motor which simultaneously powers the worms of both seat rail assemblies to thereby activate both seat rail assemblies. For a seat rail assembly with the two spindles and the two spindle nuts, it is necessary to allow for clearance between the second spindle nut, on the one hand, and the worm and/or the second spindle, on the other hand, in order to run smoothly and for the purpose of tolerance compensation. Nonetheless, this clearance can be characterized as being optional and thereby nonlimiting with respect to the scope of the present invention. As an alternative to driving the spindle nuts, the spindles could be driven with a common gear assembly.

In accordance with one aspect of the present invention, the seat rails of a seat rail assembly can be modularly selected from three different groups of seat rails, such as for adjusting the load-handling characteristics with regard to seeking to avoid structural damage. In this regard, a seat rail (e.g., selected from a first group) can partially encompass the next seat rail smaller in size (e.g., selected from a second group) and be partially encompassed by the next seat rail bigger in size (e.g., selected from a third group). Although three groups are specifically mentioned, there could be less or more groups. The generally C-shaped seat rails of a group could come in different moldings; that is, the C-shaped moldings could have different sizes or could have different shapes with respect to the partially encompassing. This can be achieved by producing the seat rails of one group with different molding sizes in the same machinery from metallic (e.g., steel) sheet strips of differing width.

Further regarding the possibility of modularly constructing the longitudinal adjuster of the present invention, it is also possible for it to be manually driven or driven by a motor.

Because of its modular construction, such as with regard to spindles and seat rails, the longitudinal adjuster of the present can be used for various purposes. The sides of the seat rail assemblies can be respectively mounted, such as by bolting, to the vehicle structure and the vehicle seat elements, and they can alternatively be mounted by other means, such as by welding.

Other aspects and advantages of the present invention will become apparent from the following.

BRIEF DESCRIPTION OF THE DRAWINGS

The present invention is explained in greater detail below with reference to one exemplary embodiment illustrated in the drawings, in which:

FIG. 1 shows a cross section through the embodiment, and this drawing is partially schematic, for example in that the round spindles and/or round passageways through the spindle nuts are schematically illustrated as non-circular, FIG. 2 schematically illustrates a vehicle seat, and FIG. 3 shows various seat rails in different molding sizes.

DETAILED DESCRIPTION OF THE INVENTION

Referring now in greater detail to the drawings, in which like numerals refer to like parts throughout the several views, a vehicle seat 1, in particular a motor vehicle seat, includes a longitudinal adjuster 3 for the purpose of adjusting the longitudinal seat position. This longitudinal adjuster has a seat rail assembly 5 on both sides of the vehicle seat 1. Each seat rail assembly 5 is connected to the vehicle structure, on the one hand, and connected the seat element 7 of the vehicle seat 1, on the other hand.

Each seat rail assembly 5 includes three molded, elongate seat rails. A first seat rail 11a is located on the inside, a second seat rail 12 extends partially around the first seat rail, and a third seat rail 13b extends partially around the second seat rail. This arrangement outlines an installation space 15 which is encircled by the combination of the seat rails 11a, 12, and 13b. The first seat rail 11a and the third seat rail 13b are fixedly connected to one another. The first and third seat rails 11a, 13b are together movable in the common longitudinal seat rail direction relative to the second seat rail 12. In order to reduce friction, balls 17 are located between the second seat rail 12 and the third seat rail 13b. The side of the second seat rail 12 is connected to structure of the vehicle. The sides of the first and third seat rails 11a, 13b are connected to the seat element 7.

Depending on the load requirements, in particular with regard to resisting detachment such as between components of the seat rail assembly 5, the seat rail assembly 5 can be modularly constructed. For example, a relatively more completely molded first seat rail 11b (FIG. 3) can be used in place of the relatively less completely molded first seat rail 11a, and/or a relatively less completely molded seat rail 13a (FIG. 3) could be used in place of the relatively more completely molded third seat rail 13b. The first seat rails 11a and 11b can be characterized as forming a group, and the third seat rails 13a and 13b can be characterized as forming another group. The seat rails of one group can be produced in the same machinery from steel sheet strips of different widths. It is also possible to cut them into appropriate sizes after they are produced by the machinery. The desired adjustment (e.g., modularity) could also be achieved by leaving out the first seat rail 11a/11b or the third seat rail 13a/13b. A further adjustment could be achieved by placing different amounts and arrangements of balls 17 between the three possible seat rails.

In order to drive the longitudinal adjuster 3 by way of a motorized drive, each of seat rail assemblies 5, which are respectively located proximate the sides of the vehicle seat 1, includes a first spindle 20 inside of the installation space 15 and extending in the longitudinal seat rail direction. For each of the seat rail assemblies 5, both ends of its spindle 20 are fixedly connected to the second seat rail 12. Internally threaded, first rotatable spindle nuts 21 are respectively placed on each of the first spindles 20, so that the internal threads of the first spindle nuts respectively mesh with the external threads of the first spindles. As a result, each first spindle nut 21 can rotatably travel along the respective first spindle 20 and thereby cause the associated second seat rail 12 to travel relative to the associated first and third seat rails 11a, 13b. More specifically in accordance with the exemplary embodiment, while each first spindle nut 21 rotates around its respective first spindle 20, travel of the first spindle nut 21 in the longitudinal direction relative to the first and third seat rails 11a, 13b is restricted in a conventional manner, so that the associated first spindle 20 and second seat rail 12 travel together in the longitudinal direction relative to the first and third seat rails.

For each of the seat rail assemblies 5, external teeth of the first spindle nut 21 (e.g., worm gear) mesh into external threads of a worm 23. The worm 23 is mounted in a conventional manner so that movement of it in the longitudinal direction relative to the first and third seat rails 11a, 13b is restricted. In accordance with the exemplary embodiment, each worm 23 is turned by a respective shaft 25, and these shafts are powered by a common motor 27. That is, a single motor 27 can substantially simultaneously turn the worm 23 of each seat rail assembly 5.

The installation space 15 is dimensioned in a way that allows room for a second spindle 30 and a second spindle nut 31. For example and not for the purpose of narrowing the scope of the present invention, the second spindle 30 and the second spindle nut 31 may be desired (e.g., required) in the installation space 15 proximate the side of the vehicle seat 1 to which the seat belt buckle (not shown) is mounted. For example, for the pair of seat rail assemblies 5 illustrated in FIG. 1, the seat belt buckle assembly can be connected to the side of the seat 1 that includes the seat rail assembly 5 with the two spindles 20, 30 and the two spindle nuts 21, 31, as opposed to being connected on the side of the seat that includes the seat rail assembly with only one spindle 20 and one spindle nut 21.

In accordance with the exemplary embodiment, this second spindle 30 would be positioned parallel to the first spindle 20 and is also fixedly connected to the second seat rail 12, and the second spindle 30 is threaded in the opposite direction as compared to the first spindle 20. Internal threads of a second spindle nut 31 mesh with the external threads of the second spindle 30 so that the second spindle nut 31 can rotatably travel along the second spindle 30. More specifically in accordance with the exemplary embodiment, while the second spindle nut 31 rotates around the second spindle 30, travel of the second spindle nut 31 in the longitudinal direction relative to the first and third seat rails 11a, 13b is restricted in a conventional manner, and the second spindle 30 and second seat rail 12 travel together in the longitudinal direction relative to the first and third sear rails.

In accordance with the exemplary embodiment, external teeth of the second spindle nut 31 (e.g., worm gear) mesh with the external threads of the previously mentioned worm 23, so that the common worm 23 provides a substantially synchronous drive for both spindle nuts 21 and 31.

Clearance is provided between the second spindle nut 31, on the one hand, and the second spindle 30 or the worm 23, on the other hand, in order to avoid blocking (e.g., jamming of) the motor 27, in accordance with the exemplary embodiment of the present invention. In accordance with the exemplary embodiment, the system of the first spindle 20 serves the purpose of longitudinal adjustment, whereas the system of the second spindle 30 serves the purpose of increasing the longitudinal locking force. In order to adjust the longitudinal locking force, the seat rail assemblies 5 can be modularly provided with one or two spindles, each in combination with a modular assembly of the seat rails. It will be understood by those skilled in the art that while the present invention has been discussed above with reference to exemplary embodiment(s), various additions, modifications and changes can be made thereto without departing from the spirit and scope of the invention as set forth in the following claims.

What is claimed is:

1. A longitudinal adjuster for a vehicle seat, the longitudinal adjuster comprising:
   a first seat rail assembly including elongate seat rails mounted together for allowing relative longitudinal movement therebetween, wherein the seat rails cooperate with one another to define a first installation space that is between the seat rails;
   a first spindle nut and a first spindle that are within the first installation space and respectively operatively connected to the seat rails
      (a) so that the first spindle nut and the first spindle are meshed with one another, and
      (b) for allowing relative rotation between the first spindle nut and the first spindle, with the relative rotation causing at least the relative longitudinal movement between the seat rails;
   a second spindle nut and a second spindle that are within the first installation space and respectively operatively connected to the seat rails
      (a) so tat the second spindle nut and the second spindle are meshed with one another, and
      (b) at least for allowing relative rotation between the second spindle nut and the second spindle during the relative rotation between the first spindle nut and the first spindle;
   a first worm mounted within the first installation space
      (a) so that the first worm is simultaneously meshed with each of the first spindle nut and the second spindle nut, and
      (b) for rotating and thereby causing at least the relative rotation between the first spindle nut and the first spindle;
   a second seat rail assembly including elongate seat rails mounted together for allowing relative longitudinal movement therebetween, wherein the seat rails of the second seat rail assembly cooperate with one another to define a second installation space tat is between the seat rails of the second seat rail assembly; and
   a third spindle nut and a third spindle that are within the second installation space and respectively operatively connected to the seat rails of the second seat rail assembly
      (a) so that the third spindle nut and the third spindle are meshed with one another, and
      (b) for allowing relative rotation between the third spindle nut and the third spindle, with the relative rotation between the third spindle nut and the third spindle causing at least the relative longitudinal movement between the seat rails of the second seat rail assembly;
   a second worm mounted within the second installation space
      (a) so that the second worm is meshed with the third spindle nut, and
      (b) for rotating and thereby causing the relative rotation between the third spindle nut and the third spindle, wherein
      (a) the first and second seat rail assemblies are operatively associated with one another so that the relative longitudinal movement between the seat rails of the first seat rail assembly is coordinated with the relative longitudinal movement between the seat rails of the second seat rail assembly,
      (b) the first and second installation spaces are sized substantially the same,
      (c) the first and second installation spaces are shaped substantially the same, and
      (d) the third spindle is the only spindle contained in the second installation space.

2. The longitudinal adjuster according to claim 1, wherein the second spindle extends parallel to the first spindle, and the first spindle and the second spindle are threaded in opposite directions with respect to one another.

3. The longitudinal adjuster according to claim 2, wherein:
   the second spindle nut is sized substantially the same as the first spindle nut, and
   the second spindle is sized substantially the same as the first spindle.

4. The longitudinal adjuster according to claim 2, wherein:
   the seat rails of the first seat rail assembly include at least a first seat rail and a second seat rail;
   at least the first seat rail is longitudinally movable relative to the second seat rail;
   the first spindle is fixedly connected to the second seat rail; and
   the second spindle is fixedly connected to the second seat rail.

5. The longitudinal adjuster according to claim 1,
   comprising a drive connected by at least one shaft to both the first worm and the second worm for simultaneously
      (1) turning the first worm so that the first worm drives at least the first spindle nut to cause at least the relative rotation between the first spindle nut and the first spindle to at least partially drive the relative longitudinal movement between the seat rails of the first seat rail assembly, and
      (2) turning the second worm so that the second worm drives the third spindle nut to cause the relative rotation between the third spindle nut and the third spindle to drive the relative longitudinal movement between the seat rails of the second seat rail assembly.

6. The longitudinal adjuster according to claim 1, wherein for each seat rail assembly of the first and second seat rail assemblies, the seat rail assembly includes at least three seat rails.

7. The longitudinal adjuster according to claim 1 in combination with the vehicle seat, so that the vehicle seat is longitudinally adjustable by way of the longitudinal adjuster.

8. The longitudinal adjuster according to claim 1, wherein for the second seat rail assembly:
   the seat rails includes at least a first seat rail and a second seat rail;
   at least the first seat rail is longitudinally movable relative to the second seat rail; and
   the third spindle is fixedly connected to the second seat rail.

9. The longitudinal adjuster according to claim 1, wherein:
   the second spindle nut is sized substantially the same as the first spindle nut, and
   the second spindle is sized substantially the same as the first spindle.

10. The longitudinal adjuster according to claim 1, wherein for the first seat rail assembly:
    the seat rails includes at least a first seat rail and a second seat rail;
    at least the first seat rail is longitudinally movable relative to the second seat rail;

the first spindle is fixedly connected to the second seat rail; and the second spindle is fixedly connected to the second seat rail.

11. The longitudinal adjuster according to claim 1, wherein:

the third spindle nut is sized substantially the same as the first spindle nut, and the third spindle is sized substantially the same as the first spindle.

12. The longitudinal adjuster according to claim 1, further comprising a motor that is operatively connected to both the first worm and the second worm, so that the motor can substantially simultaneously drive both the first worm and the second worm.

13. The longitudinal adjuster according to claim 1, wherein the third spindle nut is the only spindle nut contained in the second installation space.

14. The longitudinal adjuster according to claim 1, wherein:

the first spindle nut is positioned above the first worm, and the second spindle nut is positioned beneath the first worm.

15. The longitudinal adjuster according to claim 1, wherein:

the first worm has opposite first and second sides; and the first worm is positioned between the first and second spindle nuts so that the first side of the first worm is meshed with the first spindle nut, and the second side of the first worm is meshed with the second spindle nut.

16. The longitudinal adjuster according to claim 15, wherein:

the first spindle nut is positioned above the first worm, and the second spindle nut is positioned beneath the first worm.

17. The longitudinal adjuster according to claim 16, wherein the second spindle extends parallel to the first spindle, and the first spindle and the second spindle are threaded in opposite directions with respect to one another.

18. The longitudinal adjuster according to claim 1, wherein:

the second spindle is sized substantially the same as the first spindle, the third spindle is sized substantially the same as the first spindle, the second spindle nut is sized substantially the same as the first spindle nut, the third spindle nut is sized substantially the same as the first spindle nut, and the second worm is sized substantially the same as the first worm.

* * * * *